United States Patent
Choi et al.

(10) Patent No.: US 9,631,570 B2
(45) Date of Patent: Apr. 25, 2017

(54) APPARATUS AND METHOD FOR CONTROLLING OPERATION OF ENGINE OF VEHICLE

(71) Applicants: Hyundai Motor Company, Seoul (KR); Kia Motors Corporation, Seoul (KR)

(72) Inventors: Yong Kak Choi, Seoul (KR); Hyungseuk Ohn, Gyeonggi-do (KR); Minseok Song, Gyeonggi-do (KR); Dong Jun Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/922,131

(22) Filed: Oct. 24, 2015

(65) Prior Publication Data

US 2017/0016410 A1    Jan. 19, 2017

(30) Foreign Application Priority Data

Jul. 13, 2015   (KR) .................. 10-2015-0099335

(51) Int. Cl.
*F02D 41/30* (2006.01)
*B60W 20/00* (2016.01)
(Continued)

(52) U.S. Cl.
CPC ......... *F02D 41/3005* (2013.01); *B60W 20/00* (2013.01); *F01P 3/20* (2013.01);
(Continued)

(58) Field of Classification Search
CPC ..... F02D 41/30; F02D 41/3005; F02M 26/47; F02M 35/10; B60W 20/00
(Continued)

(56) References Cited

U.S. PATENT DOCUMENTS

2006/0107650 A1* 5/2006 Tokuda ............... F02D 41/3029
60/284
2007/0006849 A1* 1/2007 Mashiki ................ F02D 41/406
123/457

(Continued)

FOREIGN PATENT DOCUMENTS

JP    2000-064881 A    2/2000
JP    2000-110625 A    4/2000
(Continued)

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

An engine operation control apparatus and engine operation control method of a vehicle are provided. The engine operation control apparatus includes a coolant temperature sensor that detects a coolant temperature of a coolant line which passes through an engine. Further, the apparatus includes first and second maps in which corresponding engine operating points are mapped to a vehicle speed, a gear stage, a driver requesting torque, and an electric field load amount of the vehicle. A controller determines a candidate operating point using any one of the first and second maps based on a comparison between the coolant temperature and a predetermined threshold value and determines an optimal operating point of the engine using the candidate operating point.

18 Claims, 3 Drawing Sheets

(51) Int. Cl.
*F01P 3/20* (2006.01)
*F01P 11/16* (2006.01)
*F02M 35/10* (2006.01)
*F02M 26/47* (2016.01)

(52) U.S. Cl.
CPC .............. *F01P 11/16* (2013.01); *F02M 26/47* (2016.02); *F02M 35/1038* (2013.01); *B60W 2510/068* (2013.01); *B60W 2510/0676* (2013.01); *B60W 2710/0688* (2013.01)

(58) Field of Classification Search
USPC .......................................... 701/22, 108, 113
See application file for complete search history.

(56) References Cited

U.S. PATENT DOCUMENTS

| | | | | |
|---|---|---|---|---|
| 2012/0203434 A1* | 8/2012 | Sujan | ................... | B60W 50/14 |
| | | | | 701/64 |
| 2013/0297122 A1* | 11/2013 | Gibson | ................ | B60W 20/40 |
| | | | | 701/22 |

FOREIGN PATENT DOCUMENTS

| | | |
|---|---|---|
| JP | 2006-046231 A | 2/2006 |
| JP | 2011-007061 A | 1/2011 |
| JP | 2015-033971 A | 2/2015 |
| KR | 10-2008-0091530 | 10/2008 |
| KR | 10-1284345 | 7/2013 |

\* cited by examiner

APPARATUS AND METHOD FOR CONTROLLING OPERATION OF ENGINE OF VEHICLE

CROSS-REFERENCE TO RELATED APPLICATION

This application claims priority to and the benefit of Korean Patent Application No. 10-2015-0099335 filed in the Korean Intellectual Property Office on Jul. 13, 2015, the entire contents of which are incorporated herein by reference.

BACKGROUND (a) Field of the Invention

The present invention relates to an apparatus and a method for controlling operation of a vehicle engine, and more particularly, to an apparatus and a method for controlling operation of an engine of a hybrid vehicle.

(b) Description of the Related Art

A hybrid vehicle (e.g., hybrid electric vehicle) refers to a type of vehicle that is driven by efficiently combining two or more different power sources. Generally, the hybrid vehicle uses a motor having a relatively good low speed torque characteristic as a main power source at a low speed and uses an engine having a relatively good high speed torque characteristic as a main power source at a high speed. Therefore, operation of an engine which uses a fossil fuel stops in a low speed section and a motor is used as a main power source, so that the hybrid vehicle is capable of improving fuel consumption and reducing exhaust gas.

Further, an operating point of a vehicle engine is determined based on a requested torque, a vehicle speed, and a gear stage in accordance with manipulation of a driver. For a hybrid vehicle, an operating point of an engine is determined based on a system optimal operating line (OOL) which is selected to minimize fuel consumption. The system optimal operating line is set based on efficiency at a representative temperature of each part (e.g., engine, motor, transmission, or battery). In other words, the system optimal operating line of the hybrid vehicle is selected based on efficiency in a full warm up state of the engine, efficiency in a full warm up state of a motor transmission efficiency of a full warm up state of a transmission, and charging and discharging efficiency at an optimal temperature of a battery.

In the meantime, when the vehicle travels on an actual road, efficiency of each part may vary due to deviation between vehicles, a travel distance of the vehicle, and surrounding circumstances such as an outdoor temperature (e.g., surrounding environment conditions). The system optimal operating line of the related art does not reflect the efficiency variation of each part (e.g., engine, motor, transmission, or battery), and thus the engine operating point determined based on the system optimal operating line may be determined in an incorrect area, rather than a region where the fuel consumption is at a lowest, thereby reducing the fuel consumption.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling an operation of a vehicle engine which reflects efficiency variation of a part when an operating point of an engine is selected, to improve fuel consumption.

An exemplary embodiment of the present invention provides an engine operation control apparatus that may include: a coolant temperature detecting unit configured to detect a coolant temperature of a coolant line which passes through an engine; first and second maps in which corresponding engine operating points may be mapped to a vehicle speed, a gear stage, a driver requesting torque, and an electric field load amount of the vehicle; an operating point obtaining unit configured to determine a candidate operating point using any one of the first and second maps based on a comparison between the coolant temperature and a predetermined threshold value; and an operating point determining unit configured to determine an optimal operating point of the engine using the candidate operating point.

Another exemplary embodiment of the present invention provides an engine operation control method that may include detecting a coolant temperature of a coolant line which passes through an engine; obtaining a first candidate operating point using any one of first and second maps in which corresponding engine operating points may be mapped to a vehicle speed, a gear stage, a driver requesting torque, and an electric field load amount of the vehicle based on the coolant temperature, and determining an optimal operating point of the engine using the first candidate operating point.

According to exemplary embodiments of the present invention, when an operating point of an engine is determined, the operating point of an engine may be corrected based on factors which vary efficiency of an engine, to determine the operating point of the engine in an area where the fuel consumption is at a lowest, thereby improving fuel consumption.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
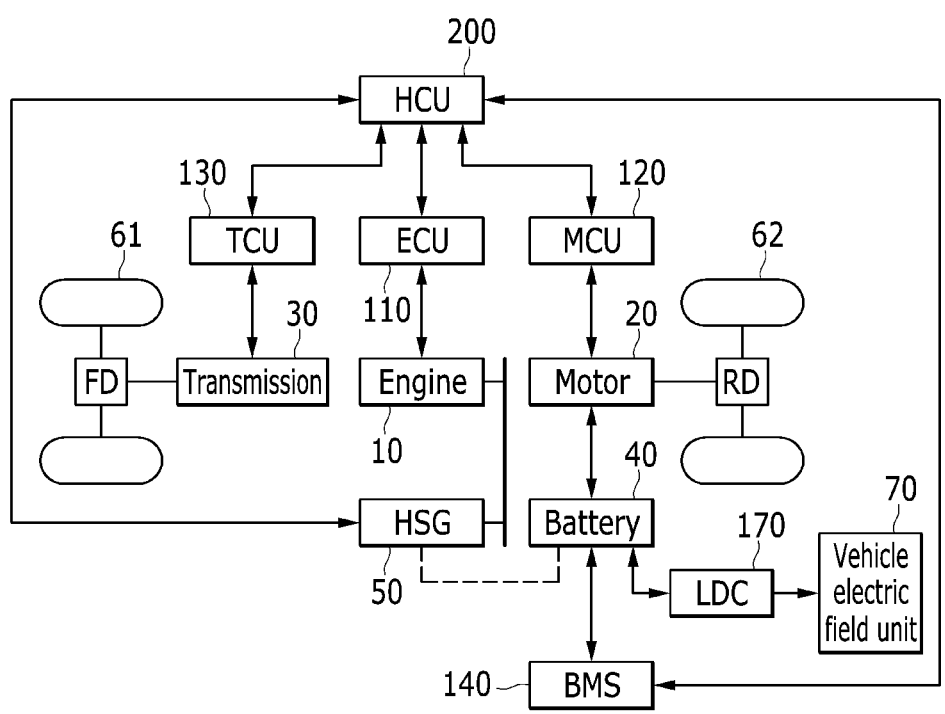
FIG. 1 is a diagram of a hybrid vehicle which performs a driving mode control method according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described more fully with reference to the accompanying drawings for those skilled in the art to easily implement of the present invention. As those skilled in the art would realize, the described exemplary embodiments may be modified in various different ways, all without departing from the spirit or scope of the present invention. In clearly describing the exemplary embodiment of the present invention, parts that are not related to the description will be omitted. Like reference numerals generally designate like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout this specification and the claims that follow, when it is described that an element is "coupled" to another element, the element may be "directly coupled" to the other element or "electrically coupled" to the other element through a third element.

Hereinafter, an engine operation control apparatus of a hybrid vehicle according to an exemplary embodiment of the present invention and an engine operation control method thereof will be described with reference to necessary drawings.

FIG. 1 is a diagram of a hybrid vehicle which performs an engine operation control method according to an exemplary embodiment of the present invention. FIG. 1 illustrates a rear wheel drive hybrid vehicle in which a dual engine clutch transmission (DCT) is mounted, as an example. However, FIG. 1 is provided to illustrate an exemplary embodiment of the present invention, but a technical spirit of the present invention is not limited thereto. The technical spirit of the present invention may be applied to all kinds of hybrid vehicle which is implemented such that an engine and a motor have separate power delivery paths, respectively.

Referring to FIG. 1, a hybrid vehicle according to an exemplary embodiment of the present invention may include an engine 10, a motor 20, a transmission 30, a battery 40, an integrated starter-generator 50, wheels 61 and 62, and a vehicle electric field unit 70.

First, the engine 10 may be configured to combust fuel to generate power and when the brake is applied to a vehicle, the motor 20 may be configured to operate as a generator to provide a driving torque to drive the wheel 62 of the vehicle. Electric energy generated by the motor 20 may be stored in the battery 40. When the transmission 30 is embodied as a dual engine clutch transmission including a plurality of engine clutches (not illustrated), the transmission 30 may be connected to the engine 10 to change power generated in the engine 10 into a necessary torque based on a speed and transmit the torque to the wheel 61.

The integrated starter-generator 50 may be configured to start the engine 10 or supplement the power of the engine 10. Additionally, the integrated starter-generator 50 may include an integrated starter & generator (ISG) or a hybrid starter & generator (HSG). The vehicle electric field unit 70 may include an electronic device which consumes electric energy within the vehicle such as a navigation, a global positioning system (GPS), or a digital multimedia broadcasting (DMB) device.

The hybrid vehicle according to an exemplary embodiment of the present invention may include at least one controller such as a hybrid control unit (HCU) 200, an engine control unit (ECU) 110, a motor control unit (MCU) 120, a transmission control unit (TCU) 130, and a battery controller (battery management system, (BMS) 140. The hybrid controller 200 may be a top level (e.g., upper) controller configured to collectively operate lower level controllers which may be connected thereto via a network and may be configured to collect and analyze information of the lower level controllers to operate the hybrid vehicle.

In particular, the ECU 110 may interwork with the HCU 200 connected thereto via the network to operate the engine 10. The MCU 120 may interwork with the HCU 200 connected thereto via the network to operate the engine 20. The TCU 130 may be configured to operate an electric actuator or a hydraulic actuator disposed in the transmission 30 in accordance with the operation of the HCU 200 connected thereto via the network to execute a gear connection of a target transmission stage. In other words, the TCU 130 may be configured to operate a plurality of engine clutches which form the transmission 30, through the actuator, to adjust the intermittence of the power generated in the engine 10. The battery controller 140 may be configured to collectively detect information regarding the battery 40 such as a voltage, a current, or a temperature to manage and adjust a state of charge (SOC) and a charged or discharged current amount of the battery 40, thereby preventing the battery from being over-discharged below a limit voltage or being over-charged above a limit voltage.

Furthermore, the hybrid vehicle according to the exemplary embodiment of the present invention may further include a power converter (e.g., low voltage direct-current direct-current (DC-DC) converter, LDC) 170. The power converter 170 may be connected between the battery 40 and the vehicle electric field unit 70 and may be configured to convert high voltage power output from the battery 40 into low voltage power used in the vehicle electric field unit 70 and transmit the low voltage power. Further, the power converter 170 may be configured to monitor output of the battery 40 to detect a load amount of a vehicle electric part which indicates electrical energy consumed in the vehicle.

The hybrid vehicle with the above-described structure may operate in a driving mode such as an electric vehicle mode (EV mode) which is an electric vehicle mode using the power of the motor 20, a hybrid electric vehicle mode (HEV mode) which is a hybrid vehicle mode using a torque of the engine 10 as a main power and a torque of the motor 20 as an auxiliary power, and a regenerative braking mode (RB mode) in which when the brake is engaged or the vehicle is driven by the inertia, brake and inertial energy may be collected by generating electricity from the motor 20 to charge the battery 40. The hybrid vehicle with the above-described structure may include an engine operation control apparatus (see reference numeral 300 of FIG. 2 which will be described below) and may be configured to adjust the operating point of the engine 10 by the engine operation control apparatus.

In the meantime, according to the exemplary embodiment of the present invention, the engine operation control apparatus 300 may be included in at least one of the control units 110, 120, 130, 140, and 200 which configure the hybrid vehicle. For example, the engine operation control apparatus 300 may be included in the hybrid control unit 200 or the engine control unit 110.

Figure 2:
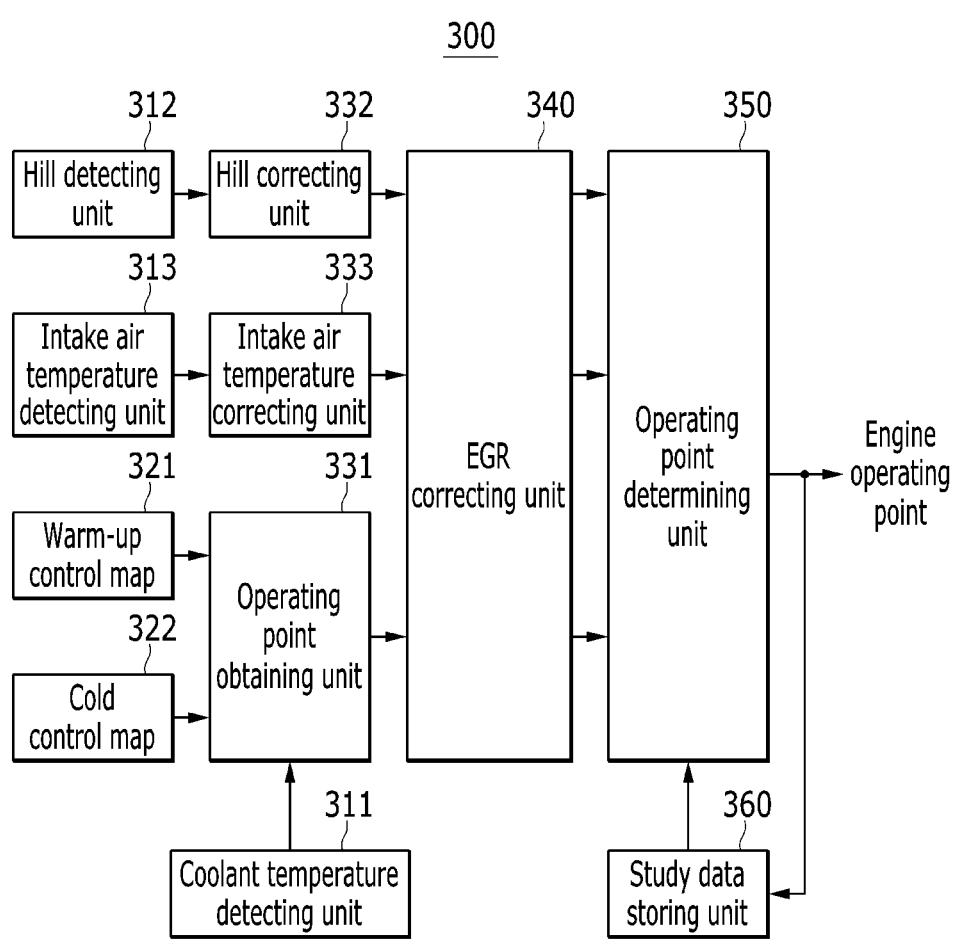
FIG. 2 is a diagram schematically illustrating an engine operation control apparatus according to an exemplary embodiment of the present invention.

An engine operation control apparatus and an engine operation control method according to an exemplary embodiment of the present invention will be described in detail below with reference to FIGS. 2 and 3. FIG. 2 is a diagram schematically illustrating an engine operation control apparatus according to an exemplary embodiment of the present invention.

Referring to FIG. 2, an engine operation control apparatus 300 according to an exemplary embodiment of the present invention may include a coolant temperature detecting unit 311, a hill detecting unit 312, an intake air temperature detecting unit 313, a warm-up control map 321, a cold control map 322, an operating point obtaining unit 331, a hill correcting unit 332, an intake air temperature correcting unit 333, an exhaust gas recirculation (EGR) correcting unit 340, an operating point determining unit 350, and a study data storing unit 360. The various units of the apparatus may be operated by the controller (e.g., the top controller) having a processor and a memory. Additionally, various sensors may be used within the units to collect various information.

The coolant temperature detecting unit 311 may include a coolant temperature sensor (not illustrated). In particular, the coolant temperature detecting unit 311 may be configured to detect a coolant temperature of a coolant line which cools the engine 10 using the coolant temperature sensor. The coolant which circulates through the coolant line may absorb heat generated from the engine 10 through heat exchange with the engine 10 while passing through the engine 10. Therefore, the temperature of the engine 10 may be estimated from the coolant temperature detected by the coolant temperature detecting unit 311.

The hill detecting unit 312 may include a pressure sensor (not illustrated). The hill detecting unit 312 may be configured to detect an atmospheric pressure using the pressure sensor and obtain hill driving information of the vehicle therefrom. The pressure sensor which may be included in the hill detecting unit 312 may include an atmospheric pressure sensor, a vacuum pressure sensor, or the like.

The intake air temperature detecting unit 313 may include a temperature sensor (not illustrated) which may be disposed in an intake air system of the vehicle. The intake air temperature detecting unit 313 may be configured to detect an intake air temperature (or an ambient temperature) of the vehicle using the temperature sensor. The warm-up control map 321 and the cold control map 322 are engine operating point maps in which engine operating points may be mapped to correspond to the vehicle speed, the gear stage, and a driver requested torque of the vehicle. When a current vehicle speed, a current gear stage, and a current driver requested torque are input, the warm-up control map 321 and the cold control map 322 may be configured to output a corresponding engine operating point.

Further, the driver requested torque may be calculated based on an accelerator pedal manipulation state, a vehicle speed, a brake pedal manipulation state, the current gear stage, and an electric field load amount of the vehicle. The accelerator pedal manipulation state indicates a degree of engagement of the accelerator pedal (e.g., the amount of pressure exerted onto the pedal) based on the manipulation of the accelerator pedal by the driver and corresponds to an accelerator pedal position sensor (APS) signal output from an APS. The brake pedal manipulation state indicates an engagement or disengagement of the brake pedal based on the manipulation of the brake pedal by the driver and corresponds to a brake pedal position sensor (BPS) signal output from a BPS.

The vehicle speed may be detected from the relationship between a revolution per minute (RPM) of the engine 10 and a gear ratio of the transmission 30. The gear stage indicates a position of the current gear stage. The electric field load amount of the vehicle is power consumption used in the vehicle and may be obtained by adding power consumption of the vehicle electric field unit 70 and power consumption of an electric air-conditioner (not illustrated).

The state of the engine 10 may be divided into a warm-up state and a cold state depending on a temperature area to which the operating temperature of the engine 10 belongs. The operating temperature of the engine 10 may be estimated from a coolant temperature of the coolant line which passes through the engine 10. Therefore, the engine operation control apparatus 300 may distinguish the warm-up state and the cold state of the operating temperature of the engine 10 using the coolant temperature. For example, when the coolant temperature detected by the coolant temperature detecting unit 311 is greater than a reference target temperature (a), the operating temperature of the engine 10 may be classified as a warm-up state and when the coolant temperature is equal to or less than the reference target temperature (a), the operating temperature of the engine 10 may be classified as a cold state.

The warm-up control map 321 is a map which may be used to determine an operating point of the engine 10 in the warm-up state of the engine 10. Engine operating points included in the warm-up control map 321 may be set by a system optimal operating line (OOL) selected based on efficiency of the engine 10 in the warm-up state. The system OOL corresponds to an engine operating area selected to include engine operating points which are selected as an optimal operating point of the engine 10 for every vehicle speed, gear stage, and driver requesting torque. An operating point at which fuel consumption of the vehicle is at a lowest may be selected as the optimal operating point of the engine 10. The cold control map 322 is a map which may be used to determine an operating point of the engine 10 in the cold state of the engine 10. Engine operating points included in the cold control map 322 may be set by the system OOL selected based on the efficiency of the engine 10 in the cold state.

The operating point obtaining unit 331 may be configured to receive the coolant temperature from the coolant temperature detecting unit 311 and determine the operating temperature of the engine 10 based on the coolant temperature. In other words, the operating point obtaining unit 331 may be configured to determine whether the engine 10 is in the warm-up state or the cold state based on the coolant temperature received from the coolant temperature detecting unit 311. For example, when the coolant temperature is greater than the reference target coolant temperature (a), the operating point obtaining unit 331 may be configured to determine that the engine 10 is in the warm-up state and when the coolant temperature is equal to or less than the reference target coolant temperature (a), the operating point obtaining unit 331 may be configured to determine that the engine 10 is in the cold state.

The operating point obtaining unit 331 may be configured to determine the engine operating point using any one of the warm-up control map 321 and the cold control map 322 based on the operating temperature of the engine 10. When the operating temperature of the engine 10 is determined as the warm-up state, the operating point obtaining unit 331 may be configured to determine the engine operating point using the warm-up control map 321. In addition, when the operating temperature of the engine 10 is determined as the cold state, the operating point obtaining unit 331 may be configured to determine the engine operating point using the cold control map 322.

When the operating point obtaining unit 331 obtains the engine operating point using the warm-up control map 321 or the cold control map 322, the engine operating point may be output as a candidate operating point to determine an operating point of the engine 10. Hereinafter, for the convenience of description, the engine operating point obtained by the operating point obtaining unit 331 using the warm-up control map 321 or the cold control map 322 is referred to as a "first candidate operating point".

The hill correcting unit 332 may be configured to determine the engine operating point that corresponds to the hill driving information of the vehicle received from the hill detecting unit 312. In particular, the hill correcting unit 332 may be configured to determine the engine operating point using an engine operating point map in which corresponding engine operating points are mapped to every vehicle speed, gear stage, and driver requesting torque of the vehicle, and may be configured to correct or adjust the engine operating point based on the hill driving information of the vehicle to obtain the engine operating point that corresponds to the current hill driving information of the vehicle.

In particular, the hill correcting unit 332 may be configured to use the warm-up control map 321 or the cold control map 322 to obtain an engine operating point that corresponds to the current vehicle speed, gear stage, and driver requesting torque of the vehicle. When the engine operating point is obtained using the warm-up control map 321 or the cold control map 322, the hill correcting unit 332 may be configured to increase or decrease the engine operating points based on the current hill driving information of the vehicle to obtain an engine operating point that corresponds to the current hill driving information of the vehicle.

The hill correcting unit 332 may further include an engine operating point map in which corresponding engine operating points may be mapped to every vehicle speed, gear stage, and driver requesting torque of the vehicle, and also to every hill and may be configured to determine the engine operating point that corresponds to the hill driving information using the same. In particular, the engine operating point map used in the hill correcting unit 332 reflects variation of the efficiency of the engine 10 of the vehicle based on the hill and may be set by mapping different engine operating points to individual hills.

When the engine operating point is obtained based on the hill driving information of a vehicle, the hill correcting unit 332 may be configured to output the engine operating point as a candidate operating point which determines an operating point of the engine 10. Hereinafter, for the convenience of description, the engine operating point corresponding to the hill driving information which is obtained by the hill correcting unit 332 is referred to as a "second candidate operating point".

The intake air temperature correcting unit 333 may be configured to receive a current intake air temperature of the vehicle from the intake air temperature detecting unit 313 and output the engine operating point corresponding thereto. The intake air temperature correcting unit 333 may be configured to determine an engine operating point using an engine operating point map in which corresponding engine operating points are mapped to every vehicle speed, gear stage, and driver requested torque of the vehicle and may be configured to correct or adjust the engine operating point based on the current intake air temperature of the vehicle to obtain an engine operating point that corresponds to the intake air temperature.

Particularly, the intake air temperature correcting unit 333 may use the warm-up control map 321 or the cold control map 322 to obtain the engine operating point that corresponds to the current vehicle speed, the gear stage, and the driver requesting torque of the vehicle. When the engine operating point is obtained using the warm-up control map 321 or the cold control map 322, the intake air temperature correcting unit 333 may be configured to increase or decrease the obtained engine operating points based on the current intake air temperature of the vehicle to obtain an engine operating point that corresponds to the current intake air temperature.

The intake air temperature correcting unit 333 may include an engine operating point map in which corresponding engine operating points are mapped to every vehicle speed, gear stage, and driver requesting torque of the vehicle, and also to individual intake air temperatures and may be configured to determine the engine operating point that corresponds to the current intake air temperature of a vehicle using the same. In particular, the engine operating point map used in the intake air temperature correcting unit 333 reflects variation in the efficiency of the engine 10 of the vehicle based on the intake air temperature and may be set by mapping different engine operating points to individual intake air temperatures.

When the engine operating point is obtained based on the intake air temperature, the intake air temperature correcting unit 332 may be configured to output the engine operating point as a candidate operating point which determines an operating point of the engine 10. Hereinafter, for the convenience of description, the engine operating point that corresponds to the intake air temperature which is obtained by the intake air temperature correcting unit 333 is referred to as a "third candidate operating point".

The EGR correcting unit 340 may be configured to receive an EGR rate from an EGR (not illustrated) apparatus. The EGR rate corresponds to a recirculation rate of the exhaust gas in the EGR apparatus and indicates a characteristic value of a time when an EGR solenoid valve is open. The EGR correcting unit 340 may be configured to receive the candidate operating points output from the operating point obtaining unit 331, the hill correcting unit 332, and the intake air temperature correcting unit 333 and correct or adjust the candidate operating points based on the EGR rate of the EGR apparatus and output the candidate operating points.

The EGR correcting unit 340 may be configured to set a corresponding operating area of the engine 10 based on the EGR rate received from the EGR apparatus. Further, the candidate operating points may be corrected such that the engine operating points output from the operating point obtaining unit 331, the hill correcting unit 332, and the intake air temperature correcting unit 333 are included in the operating area corresponding to the EGR rate, and output to the operating point determining unit 350.

In the meantime, when the vehicle does not include the EGR apparatus, the EGR correcting unit 340 may be omitted. Accordingly, the candidate operating points output from the operating point obtaining unit 331, the hill correcting unit 332, and the intake air temperature correcting unit 333 may be transmitted to the operating point determining unit 350 without passing through the EGR correcting unit 340. The operating point determining unit 350 may be configured to receive the candidate operating points from the EGR correcting unit 340 or the operating point obtaining unit 331, the hill correcting unit 332, and the intake air temperature correcting unit 333 and determine an optimal operating point of the engine 10 using the same. When the candidate operating points are received, the operating point determining unit 350 may be configured to interpolate the candidate operating points to obtain the optimal operating point of the engine 10.

The operating point determining unit 350 may further be configured to select any one of a plurality of received candidate operating points as an operating point of the engine 10. For example, when the operating temperature of the engine 10 is in the cold state, the operating point determining unit 350 may omit the interpolation of the candidate operating points and obtain the first candidate point obtained through the operating point obtaining unit 331 as an optimal operating point.

When the optimal operating point is obtained from the candidate operating points, the operating point determining unit 350 may further be configured to correct the optimal operating point based on the operating temperatures of the transmission 30, the battery 40, and the motor 20. Particularly, the operating temperature of the transmission 30 may be obtained from an oil temperature of the transmission 30 and the operating temperature of the motor 20 may be obtained from the coolant temperature of the coolant line which passes through the motor 20. The operating point determining unit 350 may be configured to perform an operating point study based on the previously selected optimal operating point by the operating point determining unit 350 to correct the optimal operating point which is currently selected, and finally determine the optimal operating point of the engine 10 using the operating point study.

When the optimal operating point of the engine 10 is determined by the operating point determining unit 350, the study data storing unit 360 may be configured to store the optimal operating point to correspond to the current vehicle speed and gear stage. Further, when the operating point determining unit 350 determines a subsequent optimal operating point, the study data storing unit 360 may provide the optimal operating point as the study data. The operating point determining unit 350 may be configured to read out the optimal operating points selected from the vehicle speed and the gear stage which are the same as the current vehicle speed and the gear stage of the vehicle, among the optimal operating points stored in the study data storing unit 360 and correct the currently selected optimal operating points using the same.

Figure 3:
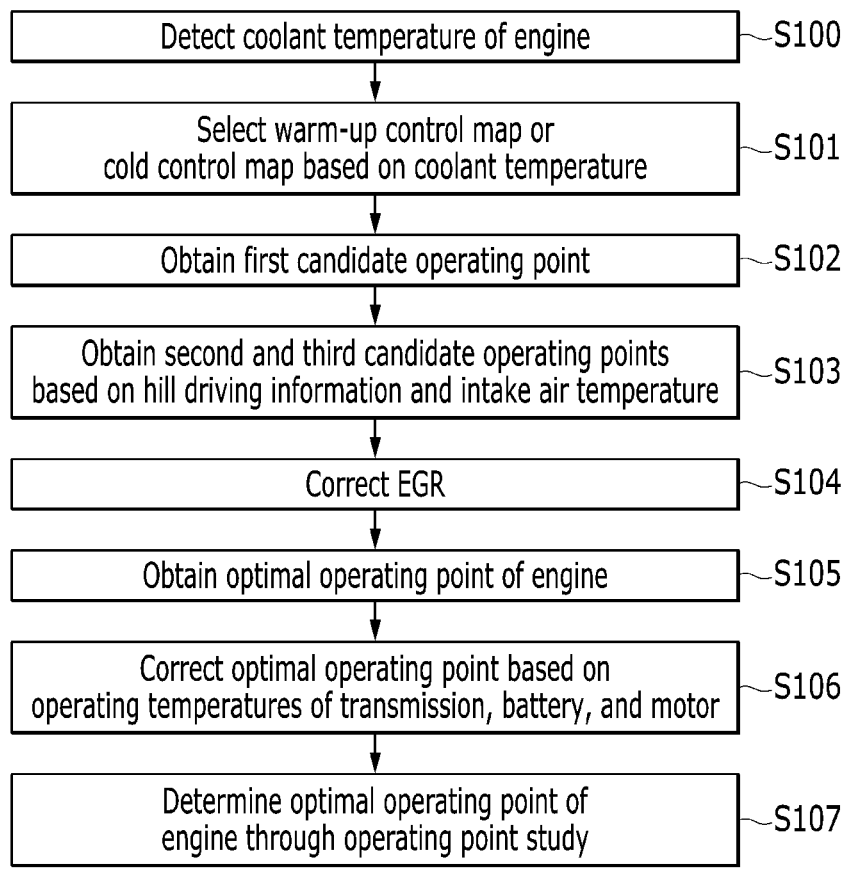
FIG. 3 is a flowchart illustrating an engine operating method of an engine operation control apparatus according to an exemplary embodiment of the present invention.

FIG. 3 is a flowchart illustrating an engine operating method of an engine operation control apparatus according to an exemplary embodiment of the present invention. Referring to FIG. 3, an engine operation control apparatus 300 according to an exemplary embodiment of the present invention may be configured to detect a coolant temperature of a coolant line which passes through the engine 10 in step S100.

The engine operation control apparatus 300 may be configured to select any one of a warm-up control map 321 and a cold control map 322 based on the coolant temperature detected in step S100 as an engine operating point map which obtains a first candidate operating point in step S101. In other words, the, engine operation control apparatus 300 may be configured to compare the coolant temperature and a previously set threshold value and determine whether the engine 10 is in a warm-state or a cold state based on the comparison result. When the engine 10 is determined to be in the warm-up state, the warm-up control map 321 may be selected as an engine operating point map for obtaining the first candidate operating point and when the engine 10 is determined to be in the cold state, the cold control map 322 may be selected as an engine operating point map for obtaining the first candidate operating point.

When the warm-up control map 321 or the cold control map 322 is selected in step S101, the engine operation control apparatus 300 may be configured to determine the first candidate operating point of the engine 10 based on the selected engine operating point map in step S102. In step S102, the warm-up control map 321 and the cold control map 322 are engine operating point maps in which corresponding engine operating points may be mapped to every vehicle speed, gear stage, and driver requesting torque of the vehicle. Further, the warm-up control map 321 is an engine operating point map set based on an efficiency of the engine 10 in the warm-up state and the cold control map 322 is an engine operating point map set based on an efficiency of the engine 10 in the cold state.

The engine operation control apparatus 300 may be configured to determine a second candidate operating point that corresponds to current hill driving information of the vehicle and determine a third candidate operating point that corresponds to a current intake air temperature of the vehicle in step S103. In step S103, the engine operation control apparatus 300 may be configured to determine the engine operating point based on the current vehicle speed, gear stage, and driver requesting torque of the vehicle, and correct the engine operating point based on the current hill driving information of the vehicle to obtain the second candidate operating point. In step S103, the engine operation control apparatus 300 may use an engine operating point map in which corresponding operating points are mapped to every vehicle speed, gear stage, and driver requesting torque of the vehicle, and also to every hill to obtain the second candidate operating point.

In step S103, the engine operation control apparatus 300 may be configured to determine an engine operating point based on the current vehicle speed, gear stage, and driver requesting torque of the vehicle and correct the engine operating point based on the current intake air temperature of the vehicle to obtain the third candidate operating point. In step S103, the engine operation control apparatus 300 may use an engine operating point map in which corresponding engine operating points are mapped for every vehicle speed, gear stage, and driver requesting torque of the vehicle, and also to the respective intake air temperature to obtain the third candidate operating point.

When the first to third candidate operating points are obtained in steps S102 and S103, the engine operation control apparatus 300 may be configured to perform EGR correction which corrects the first to third candidate operating points based on an EGR rate of the EGR apparatus in step S104. In other words, the engine operation control apparatus 300 may be configured to set an operating area of the engine 10 that corresponds to the current EGR rate and correct the first to third candidate operating points to be included in the operating area set based on the EGR rate.

Next, the engine operation control apparatus 300 may use at least one of EGR corrected first to third operating points to obtain an optimal operating point of the engine 10 in step S105. In step S105, the engine operation control apparatus 300 may be configured to interpolate the EGR corrected first to third operating points to obtain the optimal operating point.

In step S105, the engine operation control apparatus 300 may be configured to select any one of the EGR corrected first to third candidate operating points as an optimal operating point of the engine 10. For example, when the operating temperature of the engine 10 is in a cold state, the engine operation control apparatus 300 may select the first candidate point as an engine operating point. In the meantime, when the EGR apparatus is not installed in the vehicle, step S104 in which the first to third candidate points are EGR-corrected may be omitted. In particular, the engine operation control apparatus 300 may use the first to third candidate points which are not EGR corrected in step S105 to obtain the optimal operating point of the engine 10.

When the optimal operating point is obtained in step S105, the engine operation control apparatus 300 may be configured to correct the optimal operating point based on the operating temperatures of a transmission 30, a battery 40, and a motor 20 in step S106. Further, the optimal operating point corrected in step S106 may be further corrected by operating point study using the previously selected optimal operating points as study data to be finally determined as an optimal operating point of the engine 10 in step S107. The engine operating point determined as described above may be used to adjust the output of the engine 10 in the ECU 110.

In the meantime, FIG. 3 illustrates that after performing step S102 in which the first candidate operating point is obtained, step S103 in which second and third candidate operating points are obtained is performed, but the exemplary embodiment of the present invention is not limited thereto. An order of the step of obtaining the first candidate operating point and the step of obtaining the second and third candidate operating points may be changed and the step of obtaining the first candidate operating point and the step of obtaining the second and third candidate operating points may be performed in parallel.

In the related art, even though the efficiency of the engine 10 varies based on the operating temperature of the engine 10, the system optimal operating line (OOL) is selected based on efficiency of the engine 10 at a representative operating temperature (warm-up state). Therefore, the system OOL of the related art does not reflect the efficiency variation based on the operating temperature of the engine 10 so that the engine operating point which is determined based on the system OOL may actually be determined in an incorrect area, rather than a region where the fuel consumption is at a lowest, thereby lowering fuel consumption.

Accordingly, as described above, the exemplary embodiment of the present invention separately provides the warm-up control map 321 which determines an engine operating point in the warm-up state of the engine 10 and the cold control map 322 which determines an engine operating point in the cold state of the engine 10. Further, one of the control maps may be selectively used based on the operating temperature of the engine 10 to obtain the engine operating point, so that it may be possible to reflect the efficiency variation of the engine 10 based on the operating temperature to determination of the engine operating point.

Further, in the exemplary embodiment of the present invention, when the engine operating point is determined, the efficiency variation of the engine 10 based on the hill and the intake air temperature may be reflected and the efficiency variation of the engine 10 based on the travel distance of the vehicle may be reflected using the operating point study, thereby obtaining an optimal engine operating point.

As described above, according to the exemplary embodiment of the present invention, when the engine operating point is determined, the engine operating point may be corrected in consideration of the factors which vary the efficiency of the engine 10 to determine the engine operating point in an area where the fuel consumption is at a lowest, thereby improving fuel consumption.

The engine operation control method according to the exemplary embodiment of the present invention may be executed by software. When the method is executed by software, components of the present invention are code segments which perform necessary jobs. A program or code segments may be stored in a processor readable medium or transmitted by a transmitting medium or a computer data signal which is combined with a carrier wave in a communication network.

The referenced drawings and described detailed description of the present invention are the exemplary embodiment of the present invention and are used for the purpose of merely describing the present invention, not limiting the scope of the present invention which is included in the appended claims. Therefore, a person of ordinary skill in the art may easily select and replace the exemplary embodiment. Further, a person of ordinary skill in the art may omit some of the components described in the specification without degrading the performance or add components to improve the performance. Furthermore, a person of ordinary skill in the art may change an order of steps of the method described in the specification in accordance with a process environment or equipment. Therefore, the scope of the present invention needs to be determined by the claims and equivalents thereof rather than the described exemplary embodiments.

What is claimed is:

1. An engine operation control apparatus of a vehicle, comprising:
   a coolant temperature sensor configured to detect a coolant temperature of a coolant line which passes through an engine;
   first and second maps in which corresponding engine operating points are mapped to a vehicle speed, a gear stage, a driver requesting torque, and an electric field load amount of the vehicle; and
   a controller configured to determine a candidate operating point using any one of the first and second maps based on comparison of the coolant temperature and a predetermined threshold value and configured to determine an optimal operating point of the engine using the candidate operating point, wherein the controller is configured to correct the optimal operating point using at least one of hill driving information, an intake air temperature, an exhaust gas recirculation (EGR) rate, temperatures of a transmission, a battery, and a motor, and optimal operating points which are previously selected.

2. The engine operation control apparatus of claim 1, wherein the first map is a map set based on an engine efficiency when an operating temperature of the engine is included in a first area, and the second map is a map set based on an engine efficiency when an operating temperature of the engine is included in a second area which is lower than the first area.

3. The engine operation control apparatus of claim 2, wherein when the coolant temperature is greater than the threshold value, the controller is configured to determine the candidate point using the first map, and when the coolant temperature is equal to or less than the threshold value, the controller is configured to determine the candidate point using the second map.

4. The engine operation control apparatus of claim 1, further comprising:
a hill detecting sensor configured to detect the hill driving information of the vehicle,
wherein the controller is configured to determine an engine operating point that corresponds to the hill operating information as a candidate operating point.

5. The engine operation control apparatus of claim 4, wherein the controller is configured to interpolate the candidate operating point obtained using any one of the first and second maps and the candidate operating point obtained using the hill driving information to obtain the optimal operating point.

6. The engine operation control apparatus of claim 1, further comprising:
an intake air temperature sensor configured to detect the intake air temperature of the vehicle,
wherein the controller is configured to determine an engine operating point that corresponds to the intake air temperature as a candidate operating point, and
wherein the controller is configured to use at least one of a candidate operating point obtained using at least one of the first and second maps and a candidate operating point using the intake air temperature to determine the optimal operating point.

7. The engine operation control apparatus of claim 6, wherein the controller is configured to interpolate the candidate operating point obtained using at least one of the first and second maps and the candidate operating point obtained using the intake air temperature to determine the optimal operating point.

8. The engine operation control apparatus of claim 1, wherein the controller is further configured to:
correct the candidate operating point based on the exhaust gas recirculation (EGR) rate of an EGR apparatus; and
use the candidate operating point corrected using the EGR rate to determine the optimal operating point.

9. The engine operation control apparatus of claim 1, wherein the controller is further configured to:
store at least one of previously selected optimal operating point; and
determine the optimal operating point through operating point study using at least one store optimal operating point.

10. An engine operation control method of a vehicle, comprising:

detecting, by a sensor, a coolant temperature of a coolant line which passes through an engine;
obtaining, by a controller, a first candidate operating point using any one of first and second maps in which corresponding engine operating points are mapped to a vehicle speed, a gear stage, a driver requesting torque, and an electric field load amount of the vehicle based on the coolant temperature; and
determining, by the controller, an optimal operating point of the engine using the first candidate operating point, wherein the optimal operating point is corrected using at least one of hill driving information, an intake air temperature, an exhaust gas recirculation (EGR) rate, temperatures of a transmission, a battery, and a motor, and optimal operating points which are previously selected.

11. The engine operation control method of claim 10, wherein the first map is a map set based on engine efficiency when an operating temperature of the engine is included in a first area, and the second map is a map set based on engine efficiency when an operating temperature of the engine is included in a second area which is lower than the first area.

12. The engine operation control method of claim 10, wherein the determination of a first candidate operating point includes
obtaining, by the controller, the candidate point using the first map when the coolant temperature is greater than a predetermined threshold value, and
obtaining, by the controller, the candidate point using the second map when the coolant temperature is equal to or less than the threshold value.

13. The engine operation control method of claim 10, further comprising:
obtaining, by the controller, an engine operating point that corresponds to the hill driving information of the vehicle as a second candidate operating point,
wherein in the determination of an optimal operating point, the optimal operating point is determined using at least one of the first and second candidate operating points.

14. The engine operation control method of claim 13, further comprising:
obtaining, by the controller, an engine operating point that corresponds to the intake air temperature of the vehicle as a third candidate operating point,
wherein in the determination of an optimal operating point, at least one of the first, second, and third candidate operating points is used to determine the optimal operating point.

15. The engine operation control method of claim 14, wherein in the determination of an optimal operating point, the first, second, and third candidate operating points are interpolated to determine the optimal operating point.

16. The engine operation control method of claim 10, further comprising:
correcting, by the controller, the first candidate operating point based on the exhaust gas recirculation (EGR) rate of an EGR apparatus,
wherein in the determination of an optimal operating point, the first candidate operating point which is corrected based on the EGR rate is used to determine the optimal operating point.

17. A non-transitory computer readable medium containing program instructions executed by a controller, the computer readable medium comprising:

program instructions that control a sensor to detect a coolant temperature of a coolant line which passes through an engine;

program instructions that obtain a first candidate operating point using any one of first and second maps in which corresponding engine operating points are mapped to a vehicle speed, a gear stage, a driver requesting torque, and an electric field load amount of the vehicle based on the coolant temperature; and program instructions that determine an optimal operating point of the engine using the first candidate operating point, wherein the optimal operating point is corrected using at least one of hill driving information, an intake air temperature, an exhaust gas recirculation (EGR) rate, temperatures of a transmission, a battery, and a motor, and optimal operating points which are previously selected.

18. The non-transitory computer readable medium of claim 17, wherein the first map is a map set based on engine efficiency when an operating temperature of the engine is included in a first area, and the second map is a map set based on engine efficiency when an operating temperature of the engine is included in a second area which is lower than the first area.

* * * * *